United States Patent [19]

Petrowski

[11] 4,002,329

[45] Jan. 11, 1977

[54] WORKPIECE SUPPORT DEVICE

[75] Inventor: Adam Petrowski, Port Chester, N.Y.

[73] Assignee: Lawrence Peska Associates, Inc., New York, N.Y. ; a part interest

[22] Filed: Mar. 17, 1976

[21] Appl. No.: 667,717

[52] U.S. Cl. .............................. 269/318; 83/467 R

[51] Int. Cl.[2] .............................................. B23Q 3/18

[58] Field of Search ................................ 269/9–10, 269/303, 315, 318, 297–301; 83/467 R, 467 A, 468, 435.1, 474, 473.2

[56] References Cited

UNITED STATES PATENTS

| | | | |
|---|---|---|---|
| 861,124 | 7/1907 | Keeler | 83/467 |
| 1,267,447 | 5/1918 | Phelan | 269/318 |
| 2,524,168 | 10/1950 | Harnish | 269/297 |
| 2,895,513 | 7/1959 | Cowley | 83/435.1 |
| 2,895,515 | 7/1959 | Ende | 83/467 |

*Primary Examiner*—Al Lawrence Smith
*Assistant Examiner*—Robert C. Watson

[57] ABSTRACT

A device for supporting a workpiece for the cutting thereof on a power saw of the type having a table, a blade extending from the table and a miter gauge groove disposed on the table parallel to the plane of the blade. A guide member is slidably mountable in the miter gauge groove and a workpiece holder is disposed between the blade and the guide member. The workpiece holder includes an elongated first portion configured to abut against an edge of the workpiece during the cutting of the workpiece. The workpiece holder is connected to the guide member for both rotational and translational movement of both end portions of the first portion of the workpiece holder with respect to the guide member.

4 Claims, 4 Drawing Figures

FIG. 1
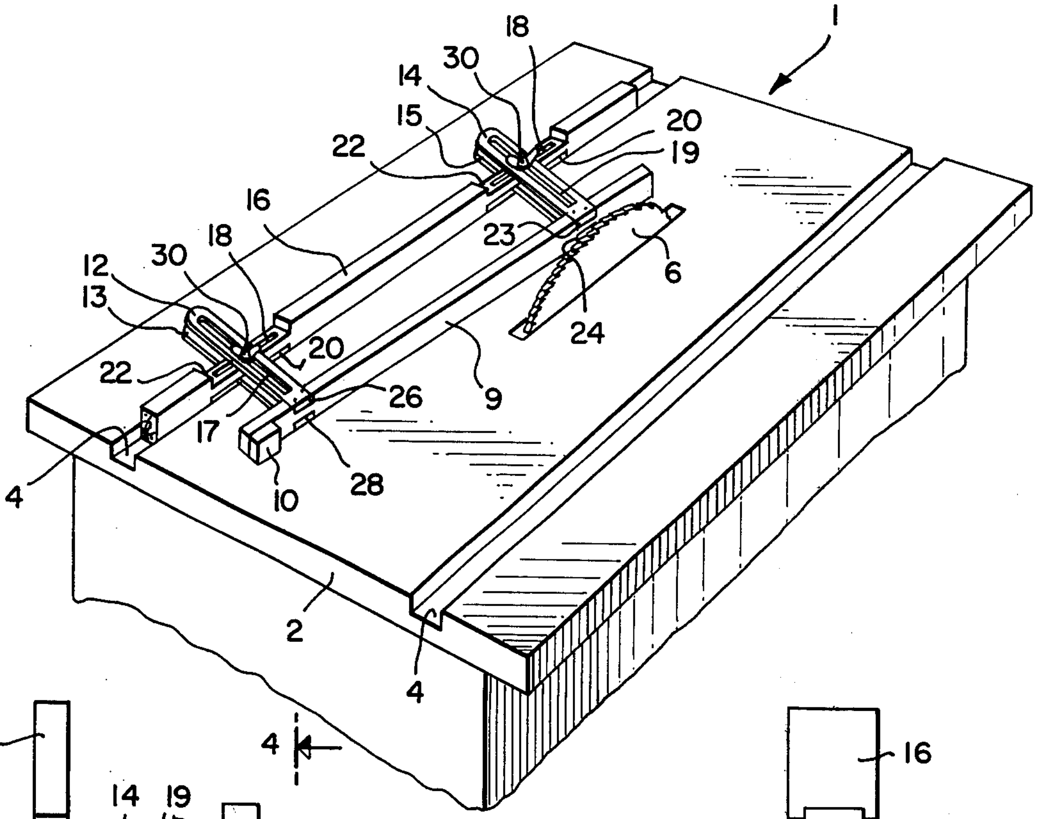
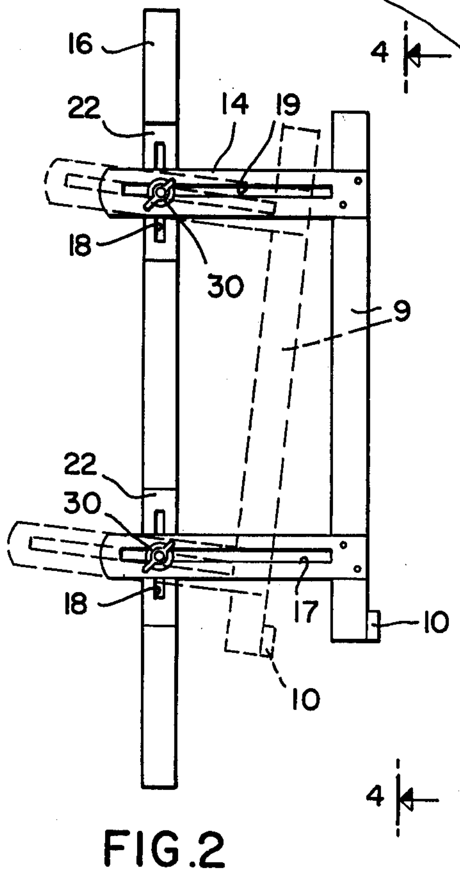
FIG. 2
FIG. 3
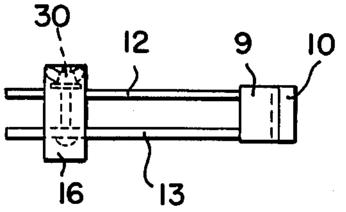
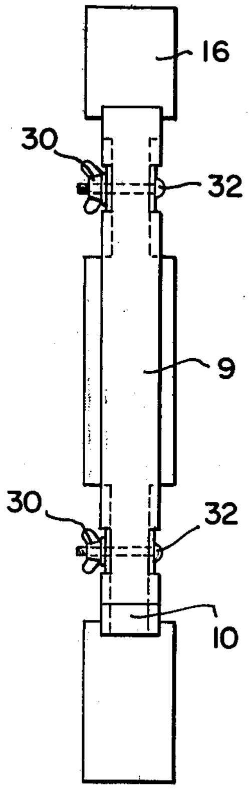
FIG. 4

WORKPIECE SUPPORT DEVICE

BACKGROUND OF THE INVENTION

The present invention relates to a device for supporting a workpiece for the cutting thereof on a power saw.

Devices and apparatuses for supporting a workpiece on a power saw are known in the prior art, but these devices and apparatuses have the disadvantage of not providing a workpiece holder that can be both rotationally and translationally moved at both end portions to obtain any desired position thereof for guiding the workpiece to be cut.

Among known prior art devices for supporting a workpiece that have this disadvantage are shown in U.S. Pat. Nos. 1,429,097, 1,853,442, 2,535,673, 2,606,580, 2,652,866, 2,752,960 and 3,187,615.

SUMMARY OF THE INVENTION

The main object of the present invention is to provide a device which overcomes the disadvantages of the prior art devices and apparatuses and which comprises a simple assembly which enables both the rotational and translational movement of both end portions of the workpiece holder with respect to the guide member.

These and other objects are achieved by the device provided in the present invention and which is hereinafter disclosed. The device supports a workpiece for the cutting thereof on a power saw of the type having a table, a blade extending from the table and a miter gauge groove disposed on the table parallel to the plane of the blade. The device comprises a guide member slidably mountable in the miter gauge groove and a workpiece holder disposed between the blade and the guide member and including an elongated first portion configured to abut against an edge of the workpiece during the cutting of the workpiece. Also provided are means connecting the workpiece holder to the guide member for both rotational and translational movement of both end portions of the first portion with respect to the guide member.

BRIEF DESCRIPTION OF THE DRAWINGS

In the drawings which constitute a part of the specification, the embodiments demonstrating the various objectives and features of the present invention are set forth as follows:

FIG. 1 is a perspective representation of the device of the present invention;

FIG. 2 is a top view showing the operation of the device of the present invention;

FIG. 3 is a side view of the device; and

FIG. 4 is a sectional view of the device along line 4—4 of FIG. 3.

DETAILED DESCRIPTION OF THE PREFERRED EMBODIMENTS

As shown in FIG. 1, the device of the present invention is for supporting a workpiece for the cutting thereof on a power saw 1 having a table 2, a blade 6 extending from the table and at least one miter gauge groove 4 disposed on the table parallel to the plane of the blade. The blade 6 may be a rotary blade or any other type of power saw blade such as a jig saw blade.

Guide member 16 is slidably mountable in miter gauge groove 4. The guide member 16 slides along in groove 4 as the workpiece is being cut.

The workpiece is held by workpiece holder 8 which includes an elongated first portion 9 and a second portion 10. The first portion is configured to abut against an edge of the workpiece during the cutting of the workpiece and the second portion 10 is disposed at one end of the first portion 9 and has an edge substantially perpendicular with the first portion 9 and configured to abut against another edge of the workpiece for urging the workpiece into the blade 6.

The workpiece holder 8 is connected to the guide member by means which allow for both rotational and translational movement of both end portions of the first portion 9 with respect to the guide member 16. These means include arms 12, 13, 14 and 15. One pair of arm members 12 and 13 are rigidly connected at one end thereof, 26 and 28, respectively, to the first portion 9 and are disposed substantial perpendicular to first portion 9. The other pair of arm members 14 and 15 are also rigidly connected to the first portion 9 at their end portions 23 and 24, respectively, and are also disposed substantially perpendicular to the first portion 9 and are spaced apart from the pair of arm members 12 and 13.

Arm members 12 and 13 each have a longitudinal slot 17 having a given width and arm members 14 and 15 also have a longitudinal slot 19 having a given width equal to the width of slot 17. Guide member 16 has two colinear longitudinal slots 18 disposed along portions thereof 22 having a reduced thickness. The distance between the two outermost points of the slots 18 is greater than the given distance between the two pairs of arm members and the distance between the two innermost points of slots 18 is less than the given distance between the two pair of arm members.

The reduced thickness portions 22 of guide member 16 are configured to receive the lowermost of each of the pair of arm members, which are 13 and 15, between the guide member 22 and the table 2. Additionally, each reduced thickness portion 22 extends beyond the ends of the corresponding longitudinal slot 18 therein and the thickness of the reduced portions 22 is substantially equal to the vertical space between each pair of arm members 12, 13 and 14, 15.

In alternative embodiments of the present invention, the pair of longitudinal slots 18 can be merely one long slot. Additionally, only two spaced apart arm members can be used in the place of the two spaced apart pairs of arm members. Also when only two arm members are used, an alternative embodiment could omit the reduced thickness portions in the guide member 16.

The workpiece holder 8 can be releasably fixed in a desired position by the use of screws 32, shown in FIG. 4 and wing nuts 30. One screw 32 extends through slots 17 in arm members 12 and 13 and slot 18 in the guide member 16 and another screw 32 extends through slots 19 in arm members 14 and 15 and corresponding slot 18 in the guide member 16. When the desired position is obtained, the wing nuts 30 are tightened and the workpiece holder 8 is releasably locked into the desired position.

FIG. 2 shows the possibility of the movement of workpiece holder 8 so that both translational and rotational movement can be obtained. As shown, the first portion 9 can be pivoted about either end portion since the adjustment shown therein in the phantom lines can be equally performed in a symetrical manner with respect to the opposite end portion. Also translational movement can be obtained by moving either or both ends of first portion 4 towards guide member 16.

In FIG. 3 it is shown that the reduced portions 22 are configured so that the top of the wing nut 30 is disposed below the top of the remaining portion of the guide member 16.

FIG. 4 shows a view along the line 4—4 of FIG. 3 where the relationship of the screws 32 and the wing nuts 30 are shown with respect to the pairs of arm members and the guide member 16 and the workpiece support portion 9.

With the device shown in the drawings, it is possible to obtain both rotational and translational movement of the workpiece holder 8 at both end portions thereof with respect to the guide member 16. Thus the workpiece that is to be cut can be positioned in any desired position simply by the adjustment of the workpiece holder 8 and its connection to the guide member 16.

While preferred embodiments of the present invention have been shown by way of example in the drawings, it will be understood that the invention is in no way limited to these embodiments.

What is claimed is:

1. A device for supporting a workpiece for the cutting thereof on a power saw of the type having a table, a blade extending from the table and a miter gauge groove disposed on the table parallel to the plane of the blade, said device comprising:

a. a guide member slidably mountable in the miter gauge groove;

b. a workpiece holder disposed between the blade and said guide member and including an elongated first portion having two end portions and configured to abut against an edge of the workpiece during the cutting thereof and a second portion disposed at one of the end portions of said first portion and having an edge substantially perpendicular with said first portion and configured to abut against another edge of the workpiece for urging the workpiece into the blade;

c. means connecting said workpiece holder to said guide member for both rotational and translational movement of both end portions of said first portion with respect to said guide member, said connecting means comprising a pair of joining means each including at least one arm member spaced apart a given distance from the arm member of the other joining means and having an end portion rigidly connected to said first portion of said workpiece holder and disposed substantially perpendicular thereto and extending toward said guide member, said joining means further including a first longitudinal slot of a given width in each arm member and wherein said connecting means further comprises two colinear second longitudinal slots in said guide member having two innermost and two outermost points with respect to each other and having said given width, wherein the distance between the two outermost points thereof is greater than said given distance and the distance between the two innermost points thereof is less than said given distance, and a pair of fastener means each engaged in the first longitudinal slot of one arm member and the corresponding second longitudinal slot of said guide member; and d. means for releasably fixing said workpiece holder in a desired position with respect to said guide member.

2. The device according to claim 1, wherein said pair of fastening means each comprise a screw having a head portion at one end and threaded at the other end, and wherein the releasably fixing means includes a pair of threaded locking means, each of said locking members engageable with one of said threaded ends of said screws to effect locking of each of said arm members against said guide member when said locking members are rotated in a tightening direction.

3. The device according to claim 2, wherein each of said pair of joining means comprises a pair of superposed and vertically spaced apart arm members and wherein said guide member includes two portions having a reduced thickness each configured to receive the lowermost of each of said pair of arm members between the guide member and the table, each reduced thickness portion extending beyond the ends of the corresponding second longitudinal slot and said reduced thickness substantially equal to the vertical space between each pair of arm members.

4. The device according to claim 3, wherein each locking member comprises a wing nut.

* * * * *